United States Patent
Takahashi et al.

(10) Patent No.: US 9,323,131 B2
(45) Date of Patent: Apr. 26, 2016

(54) FOCAL-PLANE SHUTTER AND OPTICAL DEVICE

(71) Applicant: SEIKO PRECISION INC., Narashino-shi (JP)

(72) Inventors: Hiroshi Takahashi, Narashino (JP); Mitsuru Suzuki, Narashino (JP); Minori Murata, Narashino (JP); Makoto Toriumi, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/700,708

(22) Filed: Apr. 30, 2015

(65) Prior Publication Data

US 2015/0234256 A1  Aug. 20, 2015

Related U.S. Application Data

(63) Continuation of application No. PCT/JP2013/078868, filed on Oct. 24, 2013.

(30) Foreign Application Priority Data

Nov. 1, 2012  (JP) ................................ 2012-241981

(51) Int. Cl.
*G03B 9/40*  (2006.01)

(52) U.S. Cl.
CPC ....................................... *G03B 9/40* (2013.01)

(58) Field of Classification Search
USPC ................................................ 396/486, 489
See application file for complete search history.

(56) References Cited

U.S. PATENT DOCUMENTS

| 5,371,565 | A |   | 12/1994 | Matsubara |            |
|-----------|---|---|---------|-----------|------------|
| 5,708,892 | A | * | 1/1998  | Kon       | G03B 9/42  |
|           |   |   |         |           | 396/452    |
| 2012/0183287 | A1 | * | 7/2012 | Takahashi | G03B 9/22 |
|           |   |   |         |           | 396/454    |
| 2013/0084060 | A1 | * | 4/2013 | Tokura    | G03B 9/36 |
|           |   |   |         |           | 396/453    |
| 2013/0322866 | A1 | * | 12/2013 | Suzuki   | G03B 9/42 |
|           |   |   |         |           | 396/493    |
| 2014/0010527 | A1 | * | 1/2014 | Suzuki    | G03B 9/36 |
|           |   |   |         |           | 396/469    |

FOREIGN PATENT DOCUMENTS

| JP | H05-134291 | 5/1993 |
| JP | H07-218979 | 8/1995 |
| JP | H09-179167 | 7/1997 |

(Continued)

OTHER PUBLICATIONS

International Search Report for International Application No. PCT/JP2013/078868 dated Nov. 26, 2013.

*Primary Examiner* — Clayton E LaBalle
*Assistant Examiner* — Warren K Fenwick
(74) *Attorney, Agent, or Firm* — Kratz, Quintos & Hanson, LLP

(57) ABSTRACT

A focal-plane shutter includes: first, second, and third boards each including an opening and arranged in an optical axis direction passing through the openings; a first blade arranged between the first and second boards and capable of opening and closing the openings; a second blade arranged between the second and third boards and capable of opening and closing the openings; first and second arms arranged between the second and third boards, connected to the second blade, made of synthetic resins, and capable of rotating about respective different fulcrums; and a drive member connected to the first arm and driving the first arm.

7 Claims, 3 Drawing Sheets

(56) References Cited

FOREIGN PATENT DOCUMENTS

| JP | H09-244099 | 9/1997 |
| JP | H09-281548 | 10/1997 |
| JP | 2002-14388 A1 | 1/2002 |
| JP | 2004-12526 A1 | 1/2004 |

* cited by examiner

FOCAL-PLANE SHUTTER AND OPTICAL DEVICE

CROSS-REFERENCE TO RELATED APPLICATION

This application is a continuation of and claims priority to International Patent Application No. PCT/JP2013/078868 filed on Oct. 24, 2013, which claims priority to Japanese Patent Application No. 2012-241981 filed on Nov. 1, 2012, subject matter of these patent documents is incorporated by reference herein in its entirety.

BACKGROUND (i) Technical Field

The present invention relates to focal-plane shutters and optical devices.

(ii) Related Art

Japanese Unexamined Patent Application Publication No. 09-179167 discloses a focal-plane shutter driving a blade by two arms.

To improve the shutter speed, it is contemplated that two arms are made of synthetic resins for reduced weight. In this case, the rigidity of the arms are reduced, so that the arms might flap in the optical axis direction when the blade stops after moving from a state of closing an opening to a state of opening the opening. This might damage the arms.

SUMMARY

According to an aspect of the present invention, there is provided a focal-plane shutter including: first, second, and third boards each including an opening and arranged in an optical axis direction passing through the openings; a first blade arranged between the first and second boards and capable of opening and closing the openings; a second blade arranged between the second and third boards and capable of opening and closing the openings; first and second arms arranged between the second and third boards, connected to the second blade, made of synthetic resins, and capable of rotating about respective different fulcrums; a drive member connected to the first arm and driving the first arm; and a support member provided within a working region of the first arm when viewed in the optical axis direction or in a position close to the first arm and distant from the second arm in an opened state where the second blade opens the openings, the support member being provided in the first board side and supporting the second board.

DETAILED DESCRIPTION

Figure 1:
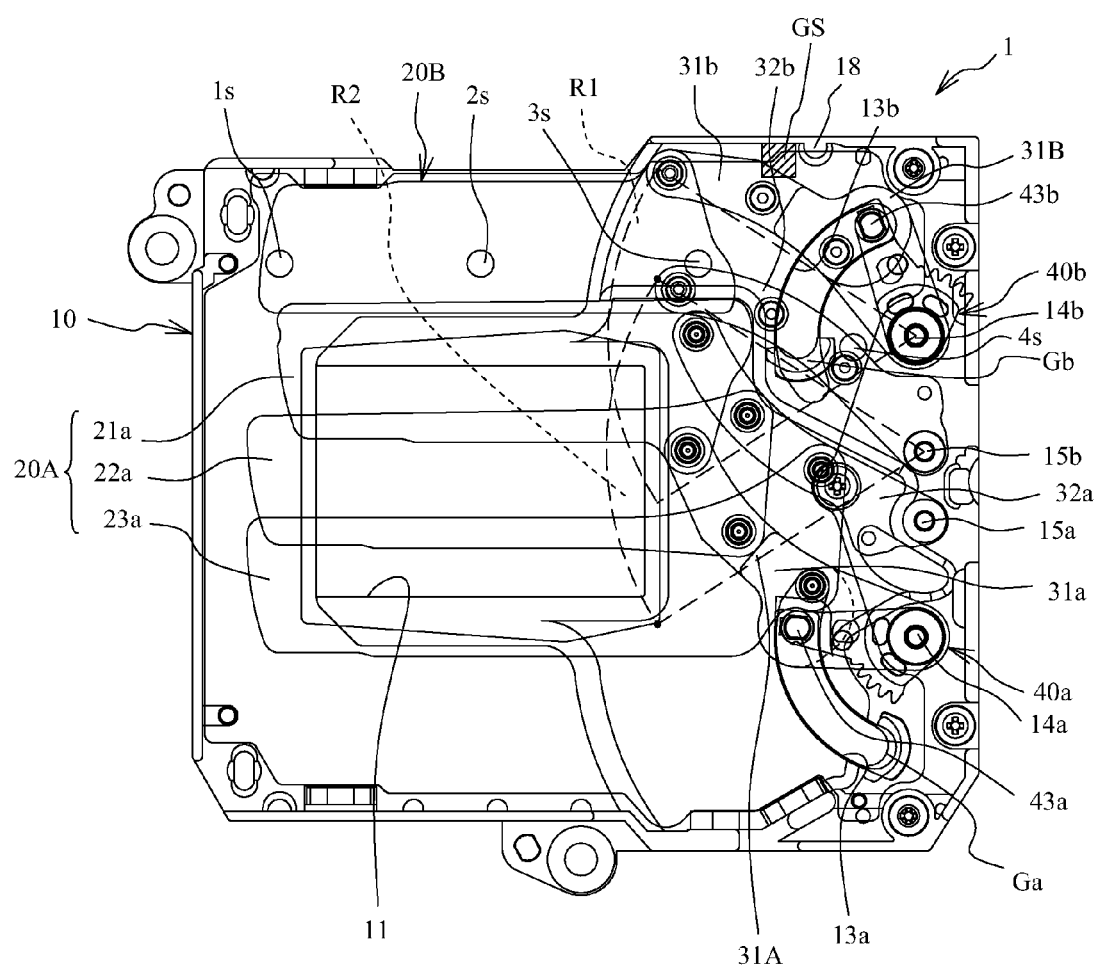
FIG. 1 is a front view of inner structure of a focal-plane shutter according to the present embodiment.
Figure 2:
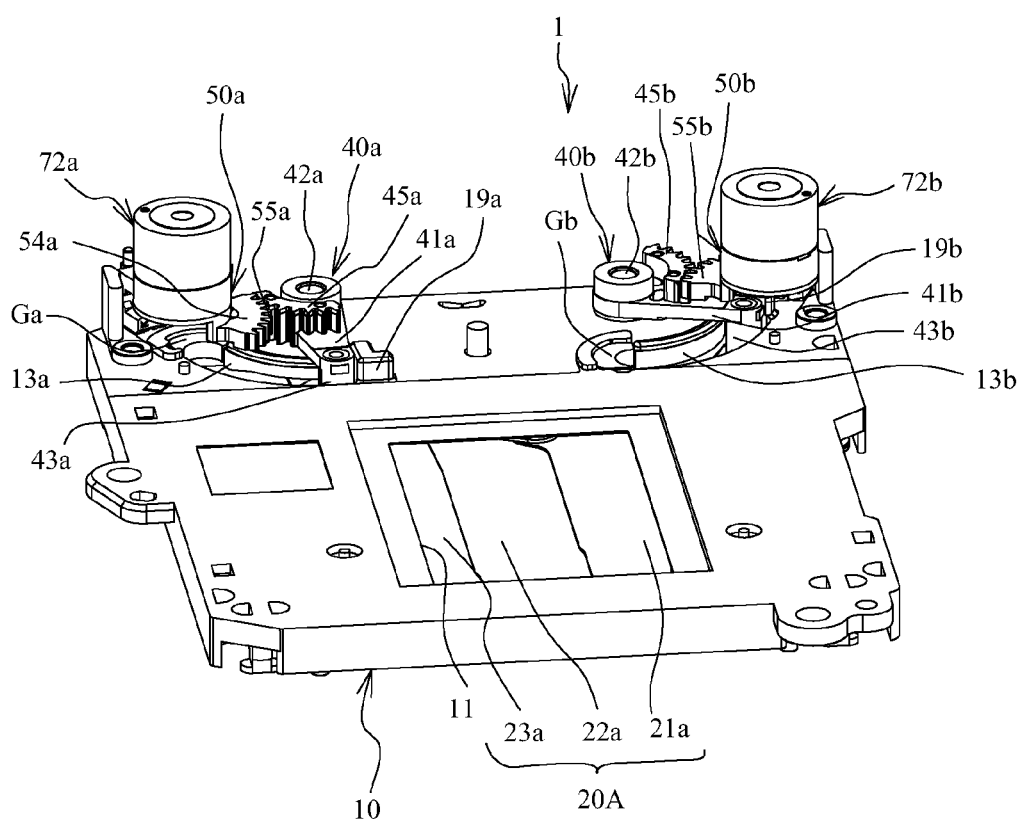
FIG. 2 is an external perspective view of the focal-plane shutter.

FIG. 1 is a front view of inner structure of a focal-plane shutter 1 according to the present embodiment. FIG. 2 is an external perspective view of the focal-plane shutter 1. The focal-plane shutter 1 is employed in an optical instrument such as a digital camera or a still camera. The focal-plane shutter 1 includes a board 10, a leading blade 20A, a trailing blade 20B, arms 31a, 32a, 31b, and 32b, drive members 40a and 40b, output members 50a and 50b, and rotors 72a and 72b. Additionally, the rotors 72a and 72b, and the output members 50a and 50b are omitted in FIG. 1. The board 10 includes an opening 11. The leading blade 20A and the trailing blade 20B open and close the opening 11. The rotor 72a is included in an actuator for driving the leading blade 20A. The rotor 72b is included in an actuator for driving the trailing blade 20B. Each actuator includes a stator around which a coil is wound, and is omitted in FIGS. 1 and 2.

The leading blade 20A includes plural blades 21a to 23a. The trailing blade 20B also includes plural blades. Each of the leading blade 20A and the trailing blade 20B can shift between an overlapped state where the plural blades overlap one another and an expanded state where the plural blades are expanded. These plural blades recede from the opening 11 in the overlapped state to bring the opening 11 into a fully opened state. These plural blades close the opening 11 in the expanded state to bring the opening 11 into a fully closed state. FIGS. 1 and 2 illustrate the state where the expanded leading blade 20A closes the opening 11 and the trailing blade 20B recedes from the opening 11.

The leading blade 20A is connected to the arms 31a and 32a. The trailing blade 20B is connected to the arms 31b and 32b. As illustrated in FIG. 1, the arms 31a, 32a, 31b, and 32b are rotatably supported by spindles 14a, 15a, 14b, and 15b provided in the board 10, respectively.

The drive members 40a and 40b drive the arms 31a and 31b, respectively. The drive members 40a and 40b are provided with drive pins 43a and 43b connected to the arms 31a and 31b, respectively. The board 10 is formed with escape slots 13a and 13b for permitting the movement of the drive pins 43a and 43b, respectively. The drive members 40a and 40b will be described later in detail. The rotors 72a and 72b are respectively connected to the output members 50a and 50b. The rotation of the rotors 72a and 72b rotates the output members 50a and 50b, so the drive members 40a and 40b rotates, which drives the leading blade 20A and the trailing blade 20B, respectively. The positions of rotational axes of the output members 50a and 50b and the drive members 40a and 40b are different from one another.

The output members 50a and 50b and the drive members 40a and 40b are respectively formed with gear portions 55a, 55b, 45a, and 45b. The gear portions 55a and 45a mesh with each other, and the gear portions 55b and 45b mesh with each other, so that the rotation of the output members 50a and 50b respectively rotate the drive members 40a and 40b. The arms 31a and 31b are partially attached with reinforcement members 31A and 31B. The arms 31a and 31b and the reinforcement members 31A and 31B are made of synthetic resin, and each thereof has a thin plate shape.

As illustrated FIG. 2, the board 10 is formed with a positioning portion 19a near one end of the escape slot 13a. Likewise, a positioning portion 19b is formed near one end of the escape slot 13b. The other ends of the escape slots 13a and 13b are provided with rubbers Ga and Gb for absorbing the impact of the drive members 40a and 40b, respectively. In addition, the board 10 is assembled with a holder holding the above actuators not illustrated.

As illustrated in FIG. 1, the board 10 is secured with a support member GS. The support member GS is separate from the board 10. Further, the board 10 is provided with plural support projections 1s to 4s. The support member GS and the support projections 1s to 4s will be described later. Furthermore, in FIG. 1, working regions R1 and R2 of the arms 31b and 32b are depicted by dotted lines.

Figure 3:
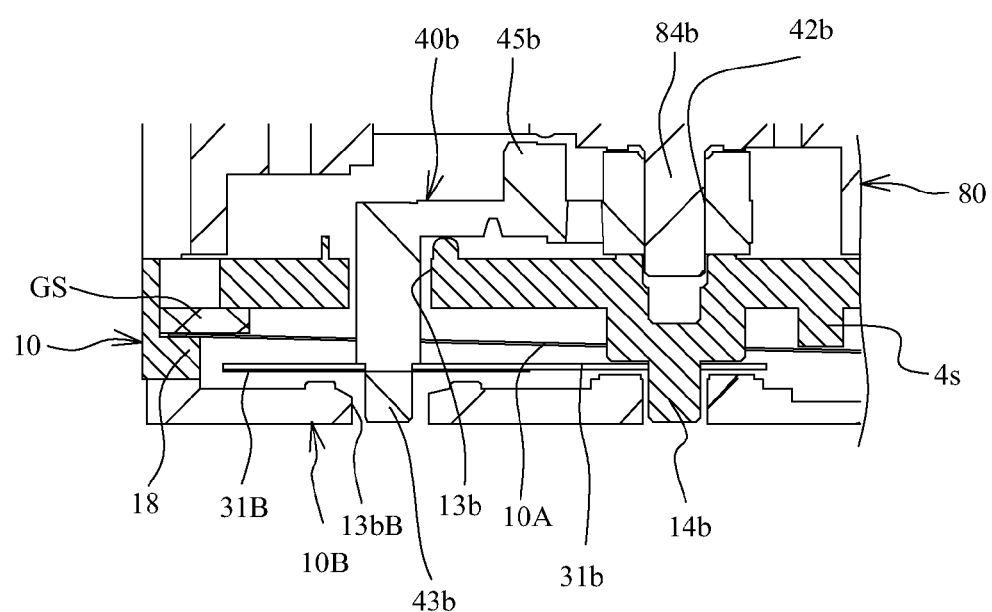
FIG. 3 is a sectional view around a support member.

FIG. 3 is a sectional view around the support member GS. Additionally, FIG. 3 is the sectional view taken along line passing through the support member GS, the drive pin 43b, and the spindle 14b in FIG. 1. As illustrated in FIG. 3, the focal-plane shutter 1 includes boards 10A and 10B besides the board 10. The boards 10 to 10B are arranged in this order in the optical axis direction. That is, the board 10A is provided between the boards 10 and 10B. Like the opening 11 provided in the board 10, an opening is provided in each of the boards 10A and 10B. The leading blade 20A and the arms 31a and 32a are arranged between the boards 10 and 10A. The trailing blade 20B and the arms 31b and 32b are arranged between the boards 10A and 10B. The board 10A prevents the interference of the leading blade 20A with the trailing blade 20B and the interference of the arm 31a with the arm 31b. The board 10 is an example of a first board. The board 10A is an example of a second board. The board 10B is an example of a third board. The leading blade 20A is an example of a first blade. The trailing blade 20B is an example of a second blade.

A holder 80 assembled on the board 10 holds the actuators not illustrated. The actuator includes the rotor 72a, the stator, and the coil. The holder 80 is assembled on the board 10. A spindle 84b of the holder 80 is fitted into a support hole 42b of the drive member 40b for rotation. Therefore, the drive member 40b is rotatably supported. The drive pin 43b extends in a predetermined direction and is connected to the arm 31b arranged between the boards 10A and 10B. As mentioned above, the arm 31b is connected to the trailing blade 20B. The arm 31b is an example of a first arm. The arm 32b not connected to the drive pin 43b but to the trailing blade 20B is an example of a second arm. Additionally, the board 10A is provided with an escape slot for receiving the drive pin 43b. The board 10B is provided with an escape slot 13bB.

The support member GS is secured to a surface, of the board 10, facing the board 10A, and supports the board 10A from the board 10 side. The support member GS is made of a rubber. In particular, the support member GS is a foamed rubber forming bubbles, but not limited to this. For example, the support member GS may be made of a synthetic resin having no elasticity or may be a rubber, a leaf spring, a coil spring, or the like having elasticity. The support member GS may be integrally formed in the board 10. In an inner peripheral edge of the board 10, a receiving portion 18 protrudes inwardly from the inner peripheral edge. The receiving portion 18 supports the board 10A from the board 10B side. In other words, the receiving portion 18 receives the board 10A serving as the second board between the receiving portion 18 and the support member GS from the board 10B side serving as the third board. Herein, the support member GS is secured near the receiving portion 18, and an end portion of the board 10A is sandwiched between the support member GS and the receiving portion 18. Further, the support projections is to 4s formed in the board 10 also support the board 10A from the board 10 side.

Next, the position of the support member GS will be described. As illustrated in FIG. 1, the support member GS is provided at a position close to the arm 31b and distant from the arm 32b in the state where the trailing blade 20B opens the opening 11. That is, it is provided near the arm 31b.

For example, the rotor 72b causes the output member 50b and the drive member 40b to rotate from the state where the trailing blade 20B closes the opening 11. Thus, the drive pin 43b of the drive member 40b moves within the escape slot 13b and abuts the positioning portion 19b. At this time, the impact is applied to the drive member 40b, so the arm 31b might flap in the optical axis direction. When the arm 31b flaps in the optical axis direction, the load is applied to the arm 31b, so the arm 31b might be damaged. In particular, since the arm 31b engages with the drive pin 43b, the area of the arm 31b is formed to be greater than that of the arm 32b. In addition, the reinforcement member 31B is also attached to the arm 31b. Thus, the arm 31b is formed to be heavier than the arm 32b. For this reason, the arm 31b tends to flap. Further, in the opened state where the opening 11 is opened, the blades of the trailing blade 20B are brought into the overlapped state. Therefore, the trailing blade 20B further tends to flap in the optical axis direction, and the arm 31b tends to flap.

In the present embodiment, the support member GS is provided near the arm 31b in the opened state of the trailing blade 20B. The support member GS presses the board 10A, whereby the board 10A suppresses the arm 31b from flapping. This can prevent the damage to the arm 31b. Further, since the support member GS has elasticity, it is possible to absorb the impact generated from the arm 31b. Furthermore, as illustrated in FIG. 1, the support member GS overlaps the arm 31b when viewed in the optical axis direction. Accordingly, the flapping of the arm 31b can be effectively suppressed thereby absorbing the impact.

Further, like the support member GS, the receiving portion 18 is formed at a position close to the arm 31b and distant from the arm 32b in the opened state where the trailing blade 20B opens the opening 11. That is, it is formed near the arm 31b. Since it is formed near the arm 31b when viewed in the optical axis direction in the opened state of the trailing blade 20B, the board 10A can be stably held between the receiving portion 18 and the support member GS. It is thus possible to suppress the flapping of the arm 31b.

Also, since the flapping of the arm 31b is suppressed, it is also possible to suppress the flapping of the arm 32b. Therefore, the arm 32b is prevented from being damaged.

In addition, the support member GS may be provided within the working region R1 when viewed in the optical axis direction. Moreover, the support member GS may be provided at a position closer to the arm 32b than to the arm 31b in the opened state.

As illustrated in FIG. 1, the support projections 3s and 4s integrally formed in the board 10 and supporting the board 10A are provided within the working region R1 of the arm 31b when viewed in the optical axis direction. It is thus possible to press the flapping of the arm 31b in the optical axis direction in cooperation with the support member GS. Further, the support projection may be provided not only within the working region R1 but also within the working region R2. It is also possible to suppress the flapping of the arm 32b in the optical axis direction.

Furthermore, the support projections is and 2s are formed at positions to overlap the trailing blade 20B in the optical axis direction in the opened state. This suppresses the trailing blade 20B from flapping through the board 10A.

In this way, the arm 31b is suppressed from flapping, thereby suppressing the trailing blade 20B from flapping. Accordingly, the operation noise of the focal-plane shutter can be reduced.

While the exemplary embodiments of the present invention have been illustrated in detail, the present invention is not limited to the above-mentioned embodiments, and other embodiments, variations and modifications may be made without departing from the scope of the present invention.

In the present embodiment, the leading blade 20A and the trailing blade 20B are driven by use of the actuators. However, the present invention is not limited to this. For example, the operation of an electromagnet and a spring may drive the blade through the drive member. Further, in the present embodiment, in order to suppress the flapping of the arm 31b driving the trailing blade 20B, the support member GS is provided in the board 10 at the arm 31b side. However, in order to suppress the flapping of the arm 31*a* driving the leading blade 20A, such a support member may be provided in the board 10B at the arm 31*a* side.

What is claimed is:

1. A focal-plane shutter comprising:
   first, second, and third boards each including an opening and arranged in an optical axis direction passing through the openings;
   a first blade arranged between the first and second boards and capable of opening and closing the openings;
   a second blade arranged between the second and third boards and capable of opening and closing the openings;
   first and second arms arranged between the second and third boards, connected to the second blade, made of synthetic resins, and capable of rotating about respective different fulcrums;
   a drive member connected to the first arm and driving the first arm; and
   a support member provided within a working region of the first arm when viewed in the optical axis direction or in a position close to the first arm and distant from the second arm in an opened state where the second blade opens the openings, the support member being provided in the first board side and supporting the second board.

2. The focal-plane shutter of claim 1, wherein at least a part of the support member overlaps the first arm when viewed in the optical axis direction in the opened state.

3. The focal-plane shutter of claim 1, wherein the support member has elasticity.

4. The focal-plane shutter of claim 1, wherein an inner peripheral edge of the first board is provided with a receiving portion within the working region of the first arm when viewed in the optical axis direction or in a position close to the first arm and distant from the second arm in the opened state, the receiving portion receiving the second board between the receiving portion and the support member from the third board side.

5. The focal-plane shutter of claim 1, wherein the first board includes a support projection provided within the working regions of the first and second arms when viewed in the optical axis direction and supporting the second board.

6. The focal-plane shutter of claim 5, wherein the support projection is provided within the working region of the first arm when viewed in the optical axis direction.

7. An optical device comprising the focal-plane shutter comprising:
   first, second, and third boards each including an opening and arranged in an optical axis direction passing through the openings;
   a first blade arranged between the first and second boards and capable of opening and closing the openings;
   a second blade arranged between the second and third boards and capable of opening and closing the openings;
   first and second arms arranged between the second and third boards, connected to the second blade, made of synthetic resins, and capable of rotating about respective different fulcrums;
   a drive member connected to the first arm and driving the first arm; and
   a support member provided within a working region of the first arm when viewed in the optical axis direction or in a position close to the first arm and distant from the second arm in an opened state where the second blade opens the openings, the support member being provided in the first board side and supporting the second board.

* * * * *